Figure 1:
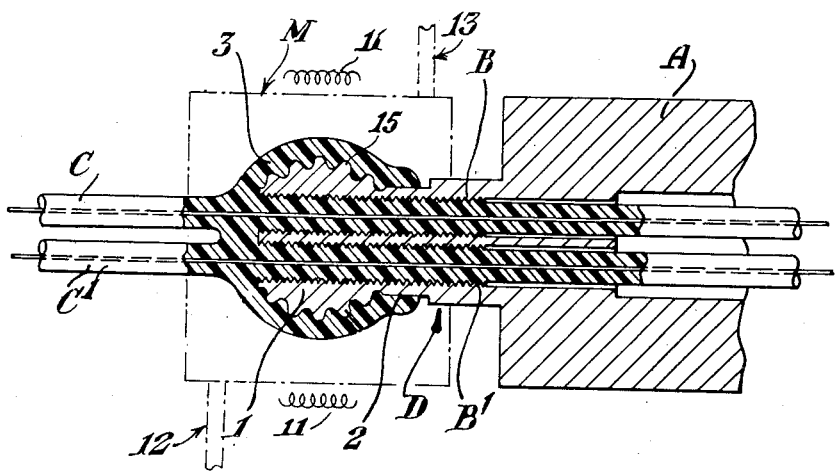

April 4, 1961  B. S. BURNETT ET AL  2,978,532
MOULDING OF THERMOPLASTIC MATERIALS
Filed March 4, 1957

United States Patent Office 2,978,532
Patented Apr. 4, 1961

2,978,532

MOULDING OF THERMOPLASTIC MATERIALS

Barrie Shaw Burnett, Orpington, and Douglas Marfleet, Bexley, England, assignors to Submarine Cables, Limited, London, England, a British company Filed Mar. 4, 1957, Ser. No. 643,606

Claims priority, application Great Britain Mar. 6, 1956

2 Claims. (Cl. 174—65)

This invention comprises a new method of moulding thermoplastic materials.

When moulding a thermoplastic covering on to a male component or projection of an article, including articles formed of metal shapes or other shaped material of higher melting point than the thermoplastic moulding material, one of the problems encountered is to secure a close application of the moulded layer or covering of thermoplastic material with the surface of the article since, due to contraction of the thermoplastic material on cooling following the moulding operation, there is a tendency of the latter to draw away from the surface to which it is applied. One example of this, and with reference to which the invention is hereinafter described in detail, is the moulding of a polythene gland on to a boss attached to the casing, e.g. of a submarine repeater housing, this casing being suitably bored to form a watertight cable entry for one or more cables.

The method used to mould thermoplastic materials on to, say, metallic projections is to enclose the projection in a heated mould which is then filled with thermoplastic material, the mould then being heated above the melting point of the thermoplastic material to soften the thermoplastic material. Further thermoplastic material is injected under pressure to cause the thermoplastic material to assume the shape of the mould, following which it is allowed to cool and set.

When this method is used to secure, say, a gland of thermoplastic material to, say, a metal boss, a good shrinkage seal of the gland material against the boss is necessary to prevent a leakage path being formed betwen the boss and the thermoplastic material. In practice, however, considerable difficulty in obtaining this shrinkage seal has been experienced due to the shape of the boss and the non-uniform shrinkage of the thermoplastic material which shrinks in some places on to the boss surface but draws away from it in other places.

According to the present invention a method of moulding thermoplastic materials to secure a joint between an applied outer covering of thermoplastic and an inner body which may be of metal or other material comprises the provision or formation of a bulge on the inner body and then causing the applied thermoplastic covering to contract on to the bulge so that on cooling contraction will take place in directions which are radial in all directions.

In carrying out the method of this invention in order to apply a coating of thermoplastic material to an article or to a part thereof, the article is enclosed within a mould, so constructed or modified that the moulding surface includes an area or areas of relatively increased cross-section, whereupon the mould is filled with the thermoplastic coating material, and thereafter the assembly is cooled by producing a temperature drop in that part or parts of the article preferably remote from the point of injection of the coating material. During cooling of the assembly, additional thermoplastic coating material may be injected under pressure to compensate for shrinkage.

It will be found that the present invention enables a covering of moulded thermoplastic article to be bonded to a metallic projection or a projection of a material with a higher melting point than the thermoplastic material, since by suitable control in the shape of the projection and of the direction of cooling when the heated thermoplastic material has been moulded in position and is cooled, the resulting contraction of the thermoplastic material is controlled to produce a surface to surface seal of itself upon the metal or thermoplastic material itself.

Figure 2:
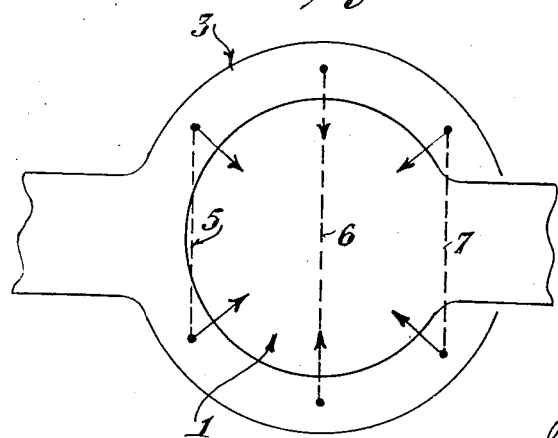

The invention is illustrated in the accompanying drawings in which Figure 1 is a sectional view of a mould casing and gland being moulded in accordance with the method of this invention. Figure 2 is a detail view.

Referring to the accompanying drawing there is shown a cable having insulated twin conductors C, C'. As is well-known in submarine cables it is the practice to provide at intervals throughout the length of the cable a repeater apparatus housing and one such housing is indicated at A, the entrance to the housing being provided through suitably dimensioned openings B, B', formed in a projecting tubular portion D at one end thereof.

In order to provide a waterproof gland between the insulation of the cable and the metal tubular end D of the housing it is desirable to continue the insulation covering so that it is snugly bedded against the outer perimeter of the end D.

We have found, in accordance with this invention, that it is necessary in order to secure tight contact between the thermoplastic material and the metallic surface to which the thermoplastic material is applied that the metal surface be provided with a bulge as indicated at 1, the effect of which is to set up a neck portion 2. The provision of the bulge will ensure that on cooling of the thermoplastic material it will contract towards a point which is located centrally of the bulge with the result that the lines of contraction set up are substantially radial with respect to a common centre point on the axis of the cable or boss in all directions.

It is a further condition of the invention that the thickness of the thermoplastic coating or layer 3 constituting the gland be substantially uniform throughout, the object being to ensure that the inner and outer surfaces of the gland remain parallel to one another so that the contracting forces set up during cooling will be relatively uniform from one end of the gland to the other.

In order, however, to explain the invention reference is now made to Figure 2 which shows three arbitrary circles 5, 6 and 7, drawn to centres located on the central axis of the cable, the two circles 5, 7, being situated adjacent the ends of the gland and the third circle 6 at a point midway therebetween. If one considers any point on these circles it will be appreciated that in contraction, the tendency of the material will be to contract in a direction toward the centre of the bulge, which line of contraction is at right angles to a plane at a tangent to the surface of the material where the extension of the line joining the said point and the centre of the bulge intersects the said surface. It follows, therefore, that as compared with a gland made around an end boss D which is of uniform cross-section throughout its entire length that it is possible by providing a bulge in the centre of the gland to set up lines of contraction which will ensure that these are substantially radial with respect to a common centre point in all directions from one end of the gland to the other.

To mould the thermoplastic material on to the tubular end boss D and around the cables C, C', the cables and the boss are arranged and held in position relative to one another, a mould casing M is then placed around the boss D with its inner surface of the same contour as the outer surface required on the thermoplastic material 3 constituting the gland, a suitable means of heating the mould M, e.g. a heating coil 11, also being provided.

The mould M is then heated to a temperature sufficient to maintain the thermoplastic material in a plastic state and then the thermoplastic material is injected through an inlet 12 in the lefthand end of the boss D. 13 is a vent outlet. The heated injected thermoplastic material on coming into contact with the conductor insulating material melts it and blends with it, the blended material flowing under pressure to fill the annular space of the threaded bores B, B′, of the tubular end boss D at the same time as the injected material fills the mould. As shown, each bore B, B′, may be screw threaded to increase adhesion.

When the mould is filled the heating is then turned off or gradually reduced and a suitable water cooling jacket may be placed around the intermediate neck portion connecting the boss to the casing to cool the assembly from the side of the boss which is opposite to the thermoplastic injection point. The thermoplastic material is then cooled from the neck portion towards the injection point and additional thermoplastic material is injected to fill any voids which are formed through the contraction during cooling of the thermoplastic material.

In a further modification to the shape of the bulge 1 we form a suitable contour to the spherical or otherwise shaped end of the boss to permit an even greater shrinkage. The sphere or other shape provides a basis for a series of rugosities 15 which may be in the form of castellations and which produce a greater adhesion of thermoplastic material to the bulge surface and also provide a longer leakage path for seepage of water between the thermoplastic material and the boss when used as a gland.

The radial arrangement of the castellations 15 and the spherical shape of the bulge 1 cause the contracting thermoplastic material to shrink very strongly on to the boss and thus the thermoplastic material forms a very good watertight joint with the boss.

Satisfactory results have been obtained by forming the gland around a part which is spherical, elliptical or any other shape which gives a relatively greater volume of metal or high melting point thermoplastic material at the central position of the moulded thermoplastic material. While the bulge 1 and, correspondingly, the surrounding layer 3 of thermoplastic material are generally spherical, conformance of these parts to precisely spherical shape is not required. However, it is important, in accordance with the invention, that the bulge be formed as a surface of revolution about the horizontal axis of the joint, with the radius of the surface of revolution in a first plane normal to the joint axis and intermediate the ends of the bulge being maximum and that the radii of the surface in other planes normal to the joint axis decrease progressively from the aforementioned first plane toward the bulge ends. Such requirements as to shape are met by the spherical bulge shown by way of example and would be met by ellipsoids or similar surfaces of revolution. While it is preferred that the thermoplastic material be moulded in a layer which is of uniform thickness over the boss, this is not essential depending on the type of gland or moulding required.

The surface of the boss metal end D and bulge may be suitably treated such as by plating to provide adhesion as well as the shrinkage. The application of a coating to the moulding surface of the article of polythene in a suitable solvent e.g. xylene is desirable, evaporation of the xylene by use of heat leaving the surface coated with a film of polythene.

What is claimed is:

1. A method of producing a gland joint between an insulated electric cable and a metal casing wherein the cable entry is through a tubular portion which comprises forming a bulge generally as a surface of revolution about the longitudinal axis of tubular portion with the radius of said surface in a first plane normal to said axis and intermediate the ends of the bulge being maximum and the radii of said surface in other planes normal to said axis decreasing progressively in opposite directions along said joint axis from said first plane toward both said bulge ends, the radius of said surface in said first plane being greater than the radii of said surface in said other planes at both of said bulge ends and between said first plane and both of said bulge ends, moulding thermoplastic material to unite it to the cable insulation and to surround said bulge continuously from end to end thereof in substantially uniform thickness, and cooling said layer to produce contraction of the layer respectively in opposite directions from said bulge ends towards the centre of the bulge.

2. In an insulated electric cable comprising a core and a layer of insulation surrounding the core, and a metal casing for electrical apparatus, which casing has a cable entry opening: a gland joint comprising a tubular portion projecting from said entry opening, a bulge on said tubular portion formed generally as a surface of revolution about the longitudinal axis of said joint with the radius of said surface in a first plane normal to the joint axis and intermediate the ends of the bulge being maximum and the radii of said surface in other planes normal to said joint axis decreasing progressively in opposite directions along said joint axis from said first plane toward both said bulge ends, and a continuous and substantially uniform layer of thermoplastic material which surrounds and is in intimate contact with said bulge from end to end thereof and which is united to the cable insulation and held in intimate contact with said tubular portion with said bulge by contractile forces which are normal to the surface of said layer.

References Cited in the file of this patent

UNITED STATES PATENTS

| 2,570,800 | Hamm | Oct. 9, 1951 |
| 2,577,466 | Jones | Dec. 4, 1951 |
| 2,580,668 | Franz | Jan. 1, 1952 |

FOREIGN PATENTS

| 1,111,241 | France | Oct. 26, 1955 |
| 640,890 | Great Britain | Aug. 2, 1950 |